(12) United States Patent
Shannon

(10) Patent No.: US 6,834,424 B2
(45) Date of Patent: Dec. 28, 2004

(54) BATTERY ASSEMBLING METHOD

(75) Inventor: John K. Shannon, Racine, WI (US)

(73) Assignee: Mitek Holdings, Inc., Chesterfield, MO (US)

( * ) Notice: Subject to any disclaimer, the term of this patent is extended or adjusted under 35 U.S.C. 154(b) by 0 days.

(21) Appl. No.: 09/862,792

(22) Filed: May 22, 2001

(65) Prior Publication Data

US 2002/0174535 A1 Nov. 28, 2002

(51) Int. Cl.$^7$ .............................................. H01M 2/20
(52) U.S. Cl. ....................... 29/623.2; 29/623.4; 29/879
(58) Field of Search ................................ 29/246, 623.2, 29/623.4, 730, 879; 164/98

(56) References Cited

U.S. PATENT DOCUMENTS

| | | | |
|---|---|---|---|
| 3,444,920 A | | 5/1969 | McAlpine et al. |
| 5,505,744 A | * | 4/1996 | Eberle et al. ............... 29/623.4 |
| 5,620,809 A | | 4/1997 | Shannon et al. ............ 429/160 |
| 5,645,612 A | | 7/1997 | Shannon et al. ........... 29/623.2 |
| 5,885,731 A | | 3/1999 | Shannon et al. ............ 429/175 |
| 6,059,848 A | | 5/2000 | Shannon et al. ........... 29/623.2 |
| 6,119,762 A | | 9/2000 | Miyagi et al. | |

FOREIGN PATENT DOCUMENTS

| | | | |
|---|---|---|---|
| EP | 0 583 021 A1 | | 2/1994 |
| EP | 583021 A1 | * | 2/1994 |
| EP | 0 734 084 A1 | | 9/1996 |
| EP | 0 297 714 A2 | | 1/1999 |

OTHER PUBLICATIONS

Partial European Search Report (EP 02 25 3513) issued by the European Patent Office, dated Aug. 3, 2004, 3 pages.

* cited by examiner

*Primary Examiner*—Susy Tsang-Foster
(74) *Attorney, Agent, or Firm*—Senniger Powers

(57) ABSTRACT

A battery container with battery plates contained therein is retained by a container positioner. A battery cover is retained by a cover positioner. Molten lead is retained within a lead dispenser/heater unit. The exposed areas of the lead dispenser/heater unit are preferably flooded with an inert gas to prevent drossing of the molten lead. A container heating platen is disposed on a top of the lead dispenser/heater unit and a cover heating platen on a bottom thereof. The container positioner brings the battery container in contact with the container heating platen and the cover positioner brings the battery cover in contact with the cover heating platen. Molten lead is dispensed into the battery cover; the lead dispenser/heater unit is withdrawn; and the battery container is sealed against the battery cover while the lugs of the battery plates are inserted into molten lead in the battery cover.

11 Claims, 14 Drawing Sheets

BATTERY ASSEMBLING METHOD

BACKGROUND OF THE INVENTION

1. Field of the Invention

The present invention relates generally to assembling lead acid batteries and more specifically to a battery assembling method which produces lead acid batteries which have many improvements over the prior art.

2. Discussion of the Prior Art

A present problem of lead acid battery manufacture is the rapid oxidation of molten lead which is exposed to the atmosphere when it is heated above the 625 degrees Fahrenheit melting point. The problem is greatly compounded when molten lead exposed to the atmosphere is further heated to nearly 1000 degrees Fahrenheit. Plate lugs of the battery cells enter such dispensed high temperature molten lead and fuse with it, the lugs further act as heat sinks for cooling the dispensed lead. At such elevated temperatures substantial drossing can occur which is wasteful, expensive, abrasive, clogging and toxic.

Accordingly, there is a clearly felt need in the art for a battery assembling machine which does not expose molten lead to the atmosphere, thus preventing drossing of the molten lead.

OBJECTS OF THE INVENTION

Accordingly, it is an object of the present invention to provide a battery assembling method which reduces the amount of equipment and manpower required.

It is a further object of the present invention to provide a battery assembling method which is rapid, efficient and relatively inexpensive.

It is yet a further object of the present invention to provide a battery assembling method which seals, but does not expose molten lead to the atmosphere, thus preventing drossing of the molten lead.

It is yet a further object of the present invention to provide a battery assembling method which does not require venting of an open lead pot.

It is yet a further object of the present invention to provide a battery assembling method which does not require lead to be pumped and a pumping device to be maintained.

Finally, it is another object of the present invention to provide a battery assembling method which does not require a large quantity of lead to be maintained at a molten temperature with the associated energy costs.

These and additional objects, advantages, features and benefits of the present invention will become apparent from the following specification.

SUMMARY OF THE INVENTION

The present invention provides a battery assembling method which is more efficient than that of the prior art. The battery assembling method includes a lead dispenser/heater unit, cover positioner, container positioner, and lead feeder. A battery container with battery plates contained therein is initially retained by a horizontal container positioner.

Lug preparation is not required when utilizing some types of lead alloys. If needed, the lug preparation area includes at least one heating station. The lug preparation area may also include at least one fluxing station, and at least one tinning station. The inclusion of the fluxing and tinning stations is dependent upon the condition of the plate lugs of the battery, before insertion into the battery assembling device. The lug preparation area disclosed in this application is given by way of example and not by way of limitation. A lug preparation area may include any combination or order of the above disclosed stations.

The horizontal container positioner indexes the battery container over the lug heating station and the lugs of the battery plates are heated before fluxing. The horizontal container positioner then indexes the battery container over the fluxing station and flux is applied to the lugs of the battery plates. The horizontal container positioner next indexes the battery container over the tinning station and the lugs are tinned with solder.

The horizontal container positioner finally indexes the battery container over the lead dispenser/heater unit. The container positioner grips the battery container and the horizontal container positioner releases its grip on the battery container. The lead dispenser/heater unit includes a container heating platen, a cover heating platen, a heater body, a lead dispensing shuttle plate, a lead reservoir and an inert gas cavity. The container heating platen is disposed on a top of the heater body and the cover heating platen is disposed on a bottom thereof. The lead reservoir is disposed in a top of the heater body. A strip opening is formed in a lead reservoir cover plate which is attached to a top of the heater body above the lead reservoir. The inert gas cavity is disposed above the lead reservoir. The inert gas cavity is filled with inert gas from a supply tank. The inert gas displaces and prevents regular air from entering the lead reservoir and drossing the molten lead.

The lead dispensing shuttle plate is disposed in a middle of the heater body. The lead dispensing shuttle plate includes at least two lead metered cavities for dispensing molten lead which forms plate straps and terminals in the battery cover. The lead dispensing shuttle plate has a fill position for retaining molten lead and a dispense position for dispensing molten lead into the battery cover.

The container positioner lowers the battery container such that an edge of an open end thereof contacts a container heating platen and the cover positioner raises the battery cover such that an edge of an open end contacts the cover heating platen. The lead dispensing shuttle plate is slid into a dispense position to direct molten lead into plate strap mold wells in the battery cover and into terminal molds to form plate straps and terminals. A dispenser actuator pulls the lead dispenser/heating unit back such that the strip opening aligns with a lead strip of the lead feeder. The lead that was dispensed for previous battery is replaced with new lead from the lead feeder.

As the dispenser actuator pulls the combination lead dispenser/heating unit, the container positioner is lowered and the cover positioner raised such that the edge of the open end of the battery container is attached to the edge of the open end of the battery cover. The container and cover heating platens heat the open end of the container and the open end of the cover such that the cover may be sealed to the container. Once the lead in plate straps and terminals solidify, the battery is grasped by a conveyer gripper and aligned with a conveyor by a conveyer actuator. A vertical conveyer actuator is raised to meet the battery. The conveyer gripper is released and the conveyer transports the completed battery to an external location. The battery assembling method is capable of producing batteries disclosed in U.S. Pat. Nos. 5,885,731 and 6,059,848.

DETAILED DESCRIPTION OF THE PREFERRED EMBODIMENTS

Figure 1:
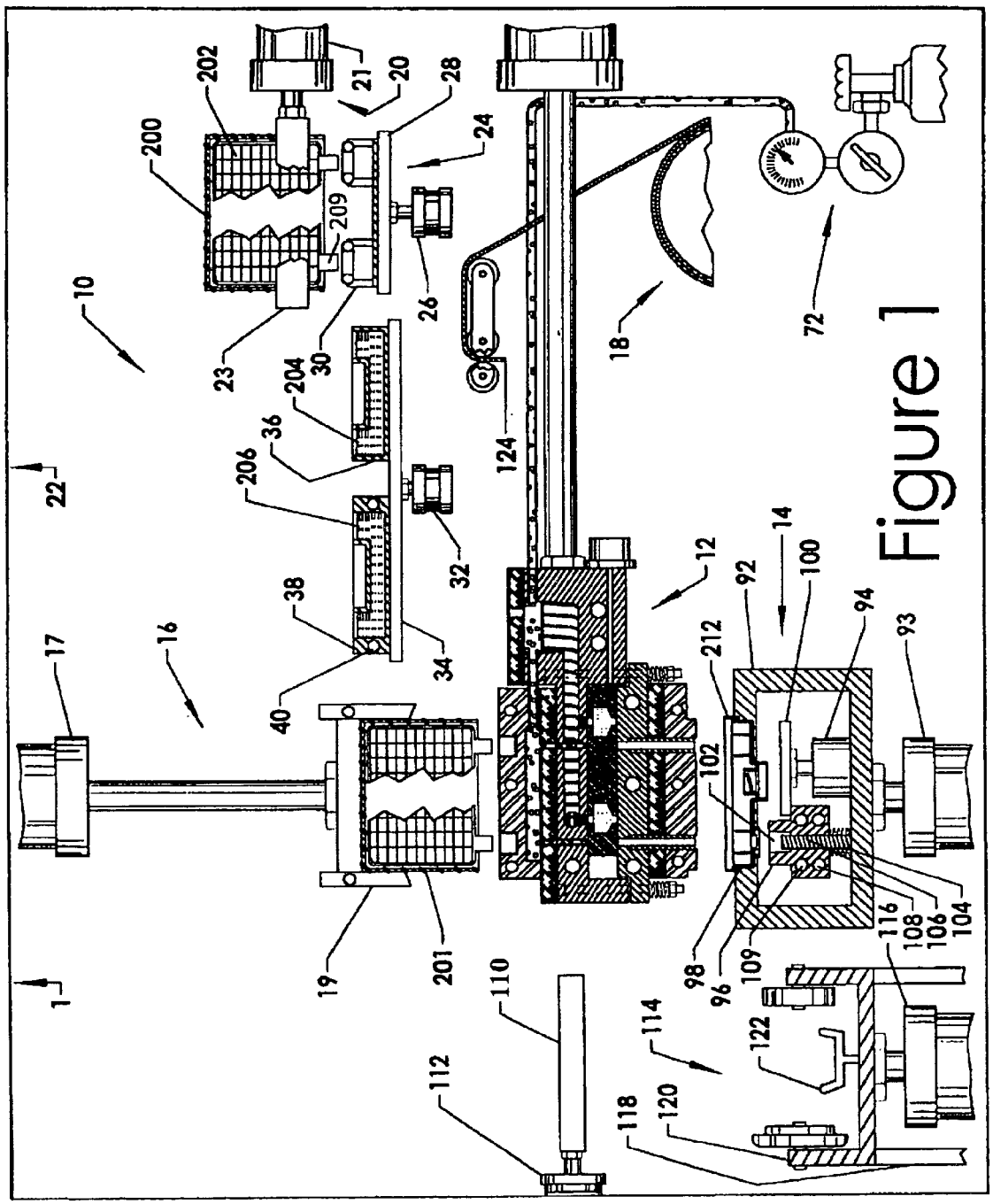
FIG. 1 is a cross sectional view of a battery assembling method with two batteries at different positions of the process in accordance with the present invention.

With reference now to the drawings, and particularly to FIG. 1, there is shown a cross sectional view of a battery assembling method. With reference to FIGS. 2–14, the battery assembling method includes a lead dispenser/heater unit 12, cover positioner 14, container positioner 16, and lead feeder 18. A first battery container 200 with battery plates 202 contained therein is retained by a horizontal container positioner 20. The horizontal container positioner 20 includes a horizontal container actuator 21 and gripper fingers 23. The above items are preferably retained in some type of frame 22.

A lug preparation area 10 is not required when utilizing some types of lead alloys. If needed, the lug preparation area includes at least one heating station 24. The at least one heating station 24 preferably includes a heating actuation device 26, a mounting plate 28, and at least one heating element 30. Preferably, an inductive heating element is used, but other types of heating devices may also be used. The lug preparation area 10 may also include at least one fluxing station, and at least one tinning station. The inclusion of the fluxing and tinning stations is dependent upon the condition of the plate lugs of the battery and the lead alloy used in the battery, before insertion into the battery assembling device 1.

The lug preparation area 10 disclosed in this application is given by way of example and not by way of limitation. A lug preparation area may include any combination or order of the above disclosed stations. As disclosed by example in this application, a lug actuator 32 is used to provide vertical moment to a lug plate 34. A fluxing pan 36 is attached to a top of the lug plate 34 and contains a quantity of flux 204. A tinning pan 38 is attached to a top of the lug plate 34 and contains a quantity of molten solder 206. At least one heater element 40 is used to maintain the solder at a molten temperature. The container positioner 16 includes a container actuator 17 and container gripping fingers 19 which are attached to a moving end of the container actuator 17.

Figure 2:
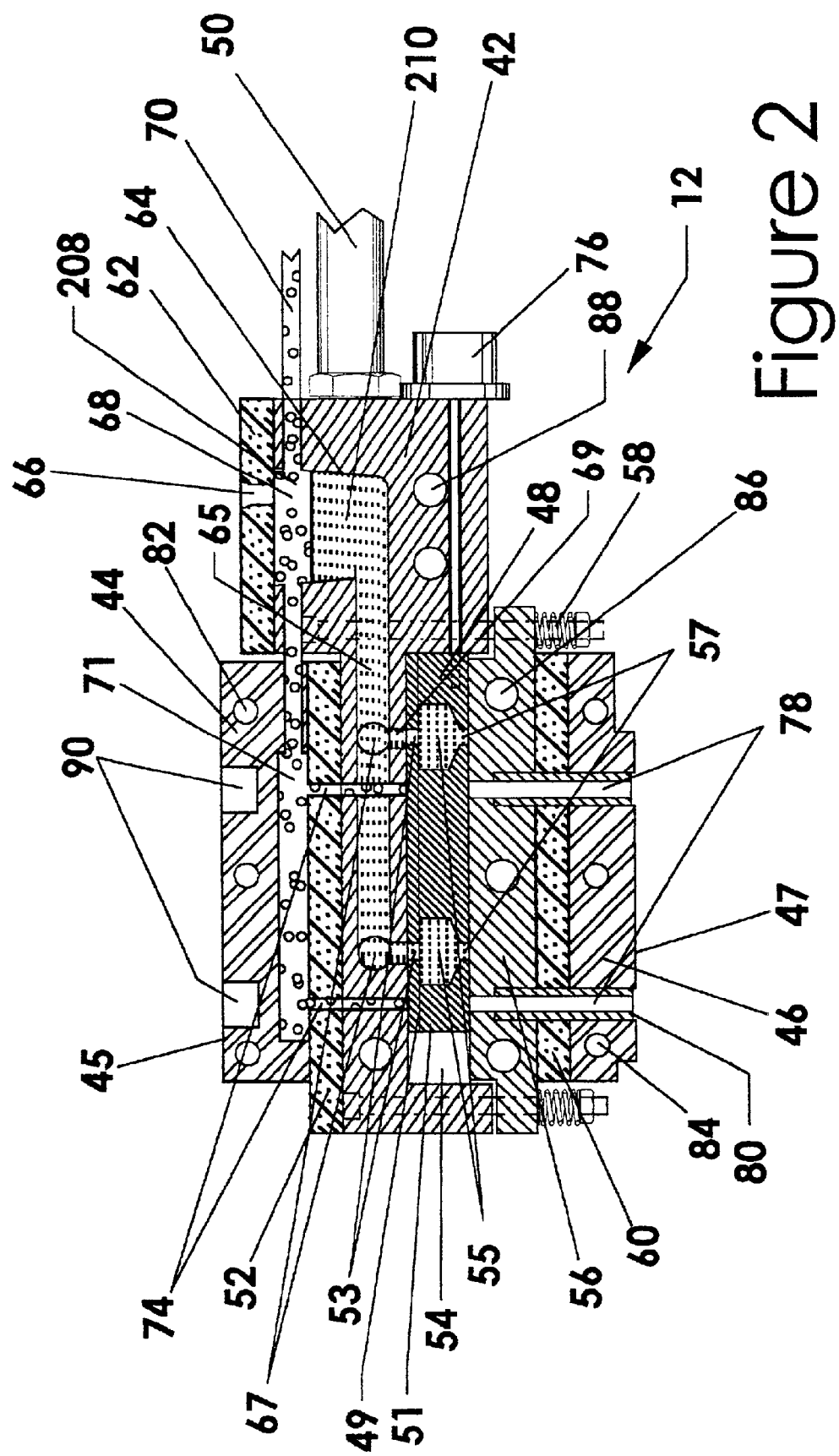
FIG. 2 is an enlarged cross sectional view of a lead dispenser/heater unit in accordance with the present invention.

With reference to FIG. 2, the lead dispenser/heater unit 12 includes a heater body 42, a container heating platen 44, a cover heating platen 46, a lead dispensing shuttle plate 48, and a dispenser actuator 50. The container heating platen 44 is attached to a top of the heater body 42 with a cover insulator 52 inserted therebetween. The lead dispensing shuttle plate 48 preferably includes a top plate 49 and a bottom plate 51. At least two lead entrance openings 53 are formed through the top plate 49. At least two lead metered cavities 55 are formed in the lead dispensing shuttle plate 48 in line with the at least two lead entrance openings 53. A lead exit opening 57 is formed through a bottom of each lead metered cavity 55. A shuttle slot 54 is formed in a bottom of the heater body 42. The shuttle slot 54 is sized to slidably receive the lead dispensing shuttle plate 48.

A shuttle retention plate 56 retains the lead dispensing shuttle plate 48 under spring force. At least two spring loaded bolts 58 force a top of the shuttle retention plate 56 against a bottom of the lead dispensing shuttle plate 48 and a top of the lead dispensing shuttle plate 48 against a top of the shuttle slot 54. The force fit between the top and bottom of the lead dispensing shuttle plate 48 is required to prevent molten lead from leaving the lead metered cavities 55 and smearing on the top or bottom of the lead dispensing shuttle plate 48. The cover heating platen 46 is attached to a bottom of the shuttle retention plate 56 with a container insulator 60 inserted therebetween. The container and cover insulators allow the container and cover heating platens to be maintained at a different temperature than the heater body 42.

A lead reservoir cover plate 62 covers a top of a lead reservoir 64 formed in a top of the heater body 42. A lead strip opening 66 is formed through the lead reservoir cover plate 62, adjacent the lead reservoir 64. A lead passage 65 is formed adjacent the lead reservoir 64. At least one lead cross passage 67 is formed adjacent the lead passage 65. At least two lead feed openings 69 are supplied with molten lead 210 from the lead passage 65 or at least one lead cross passage 67. An insert gas reservoir passage 68 is formed over the lead reservoir 64. The inert gas reservoir passage 68 receives inert gas through an inlet pipe 70. An inert gas tank 72 supplies the insert gas 208. The inert gas 208 prevents drossing of the molten lead 210 in the lead reservoir 64. An inert gas passage 71 is formed in a bottom of the container heater platen 44. At least two inert gas passage openings 74 are formed through the container insulator 52 and the heater body 42. A shuttle actuator 76 is used to slide the lead dispensing shuttle plate 48 from a fill position to a dispensing position. An end of the shuttle plate 48 is attached to a moving end of the shuttle actuator 76.

At least two lead dispense openings 78 are formed through the shuttle retention plate 56, container insulator 60, and cover heating platen 46 in line with the at least two lead metered cavities 55 when in a dispense position. Preferably, a lead dispense bushing 80 is formed partially through the shuttle retention plate 56, and through the container insulator 60, and cover heating platen 46. When the lead dispensing shuttle plate 48 is in a dispense position inert gas flows behind the molten lead 210 through the lead dispense openings 78.

The inert gas 208 prevents air from entering through the at least two lead dispense openings 78 until the lead dispensing shuttle plate 48 is moved to a fill position. The inert gas 208 bubbles through the molten lead 210 to the inert gas reservoir passage 68 as the at least two lead metered cavities 55 are filled with molten lead 210. If air were allowed to fill the at least two lead metered cavities 78, the air would dross the molten lead 210.

At least two container heaters 82 are formed in the container heating platen 44. At least two cover heaters 84 are formed in the cover heating platen 46. At least two retainer heaters 86 are formed in the shuttle retention plate 56. At least two body heaters 88 are formed in the heater body 42. A plurality of lug clearance openings 90 are formed in a top of the container heating platen 44.

With reference to FIG. 1, the cover positioner 14 includes a cover base 92, a cover actuator 93, a mold actuator 94, and at least two terminal molds 96. A bottom of the cover base 92 is attached to a moving end of the cover actuator 93. The cover actuator 93 provides vertical motion to the cover base 92. A cover cavity 98 is formed on a top of the cover base 92 to receive the battery cover 212.

A retainer plate 100 is attached to a moving end of the mold actuator 94. Terminal cavity 102 is formed in a top of each terminal mold 96. Each terminal mold 96 is slidably retained on a slide rod 106 and urged upward with a spring 104. The retainer plate 100 restricts the upward movement of the terminal mold 96. At least one liquid coolant path 108 and at least one mold heater 109 are formed in the body of each terminal mold 96.

Gripper fingers 110 extend from a moving end of a conveyor actuator 112. A battery conveyor 114 includes a vertical conveyor actuator 116, stationary conveyor base 118, moveable conveyor section 120, and a coolant spray 122. The moveable conveyor section 120 is attached to a moving end of the vertical conveyor actuator 116. The coolant spray 122 is attached to a bottom of the moveable conveyor section 120.

Figure 5:
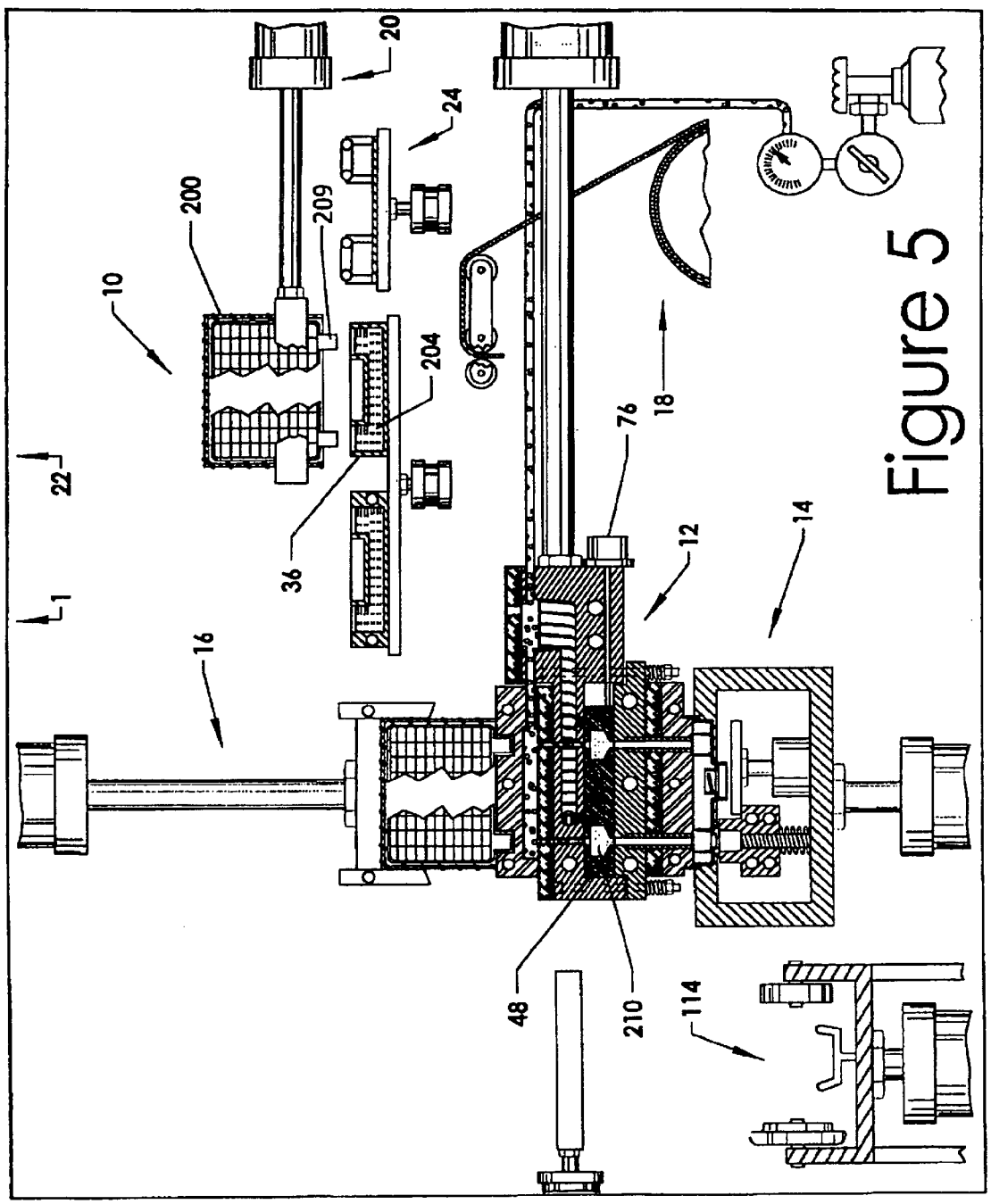
FIG. 5 is a cross sectional view of a battery assembling method showing a first battery container indexed over a fluxing station; and a shuttle plate slid to a dispense position in accordance with the present invention.
Figure 6:
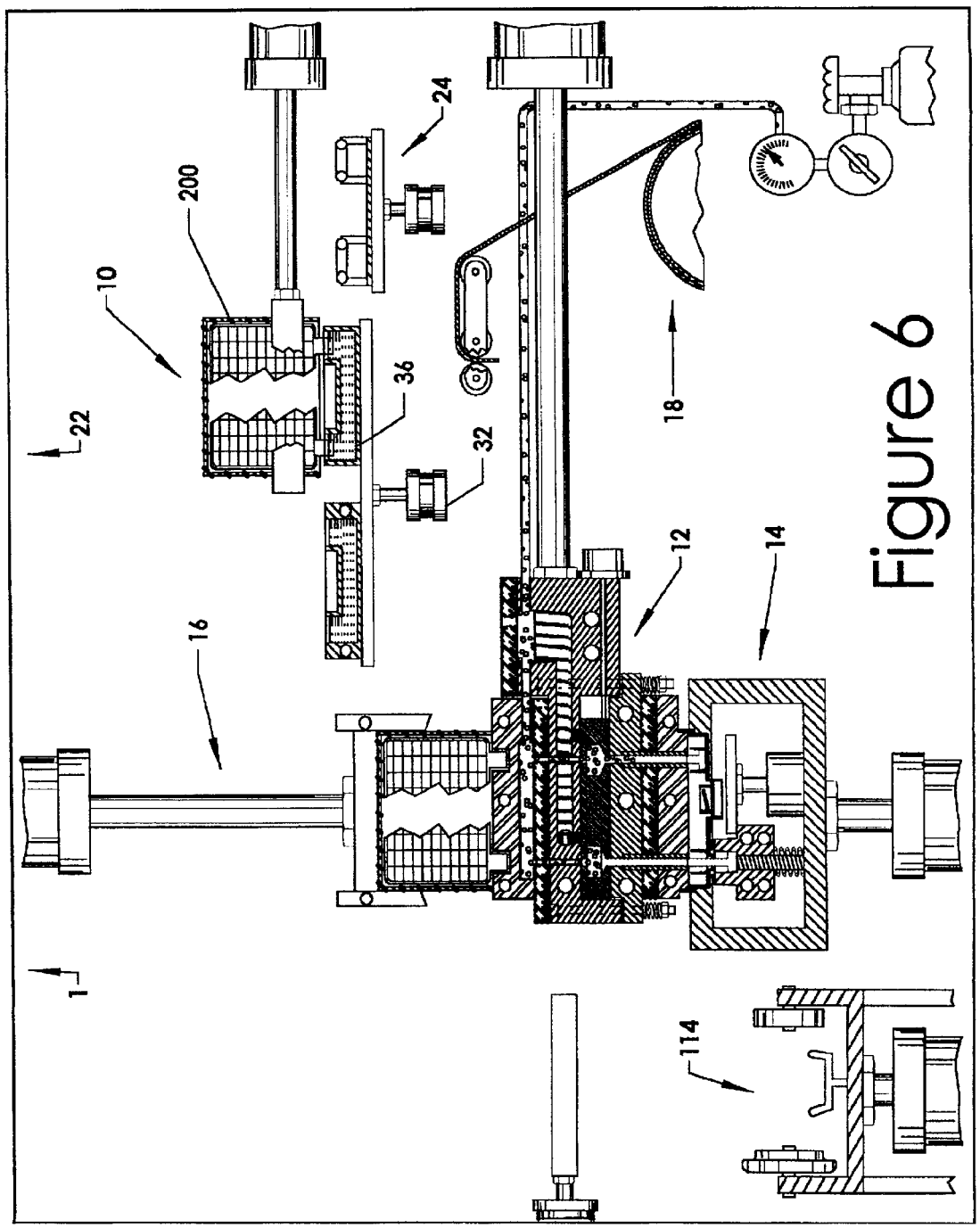
FIG. 6 is a cross sectional view of a battery assembling method showing plate lugs of a first battery container being fluxed; plate strap and terminal molds of a second battery cover being filled with molten lead in accordance with the present invention.
Figure 7:
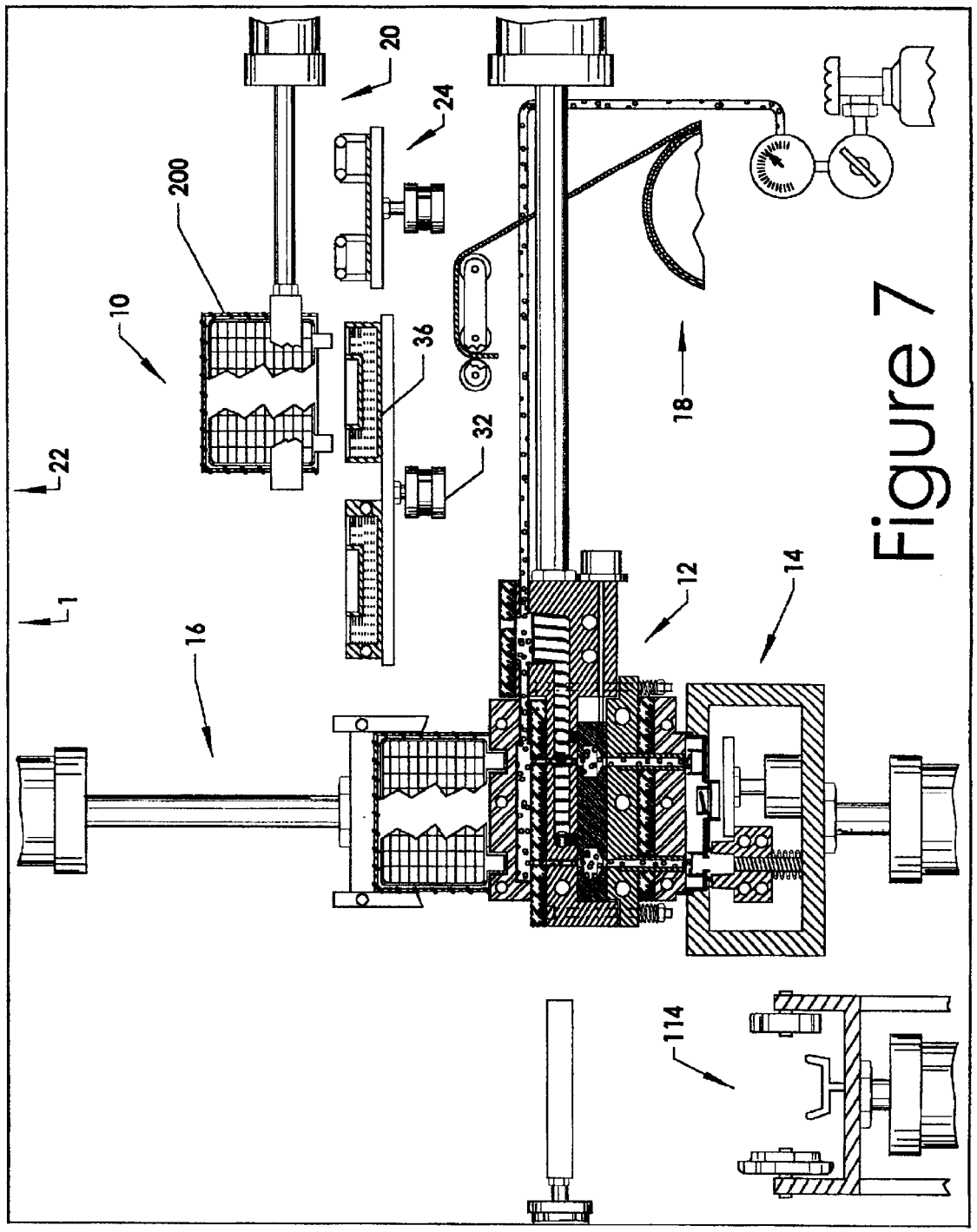
FIG. 7 is a cross sectional view of a battery assembling method showing plate lugs of a first battery container after fluxing; plate strap and terminal molds of a second battery cover tilled with molten lead in accordance with the present invention.
Figure 8:
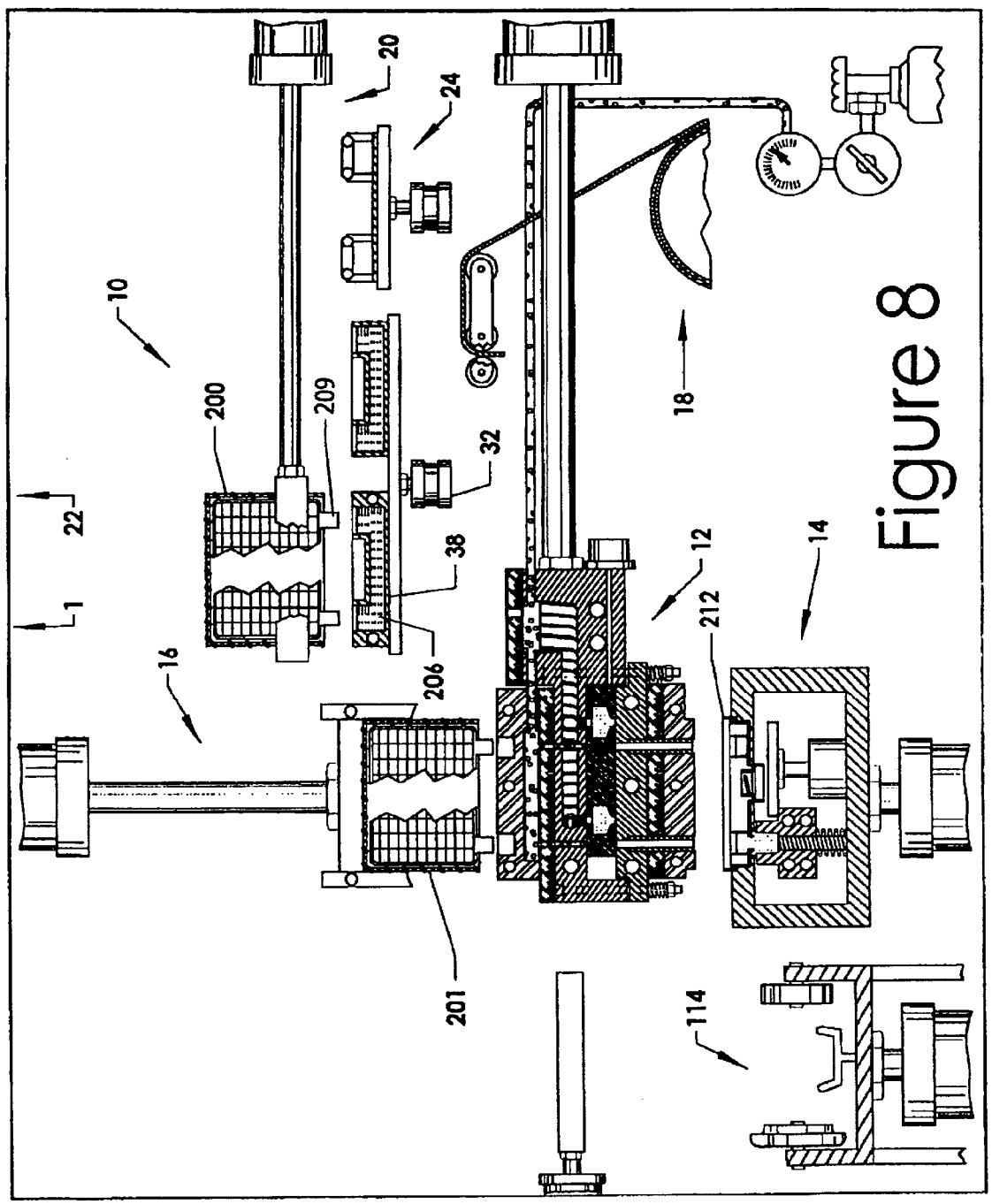
FIG. 8 is a cross sectional view of a battery assembling method showing a first battery container indexed over a tinning station; battery cover and container positioners bringing a second battery cover and container away from a lead dispenser/heater unit in accordance with the present invention.
Figure 9:
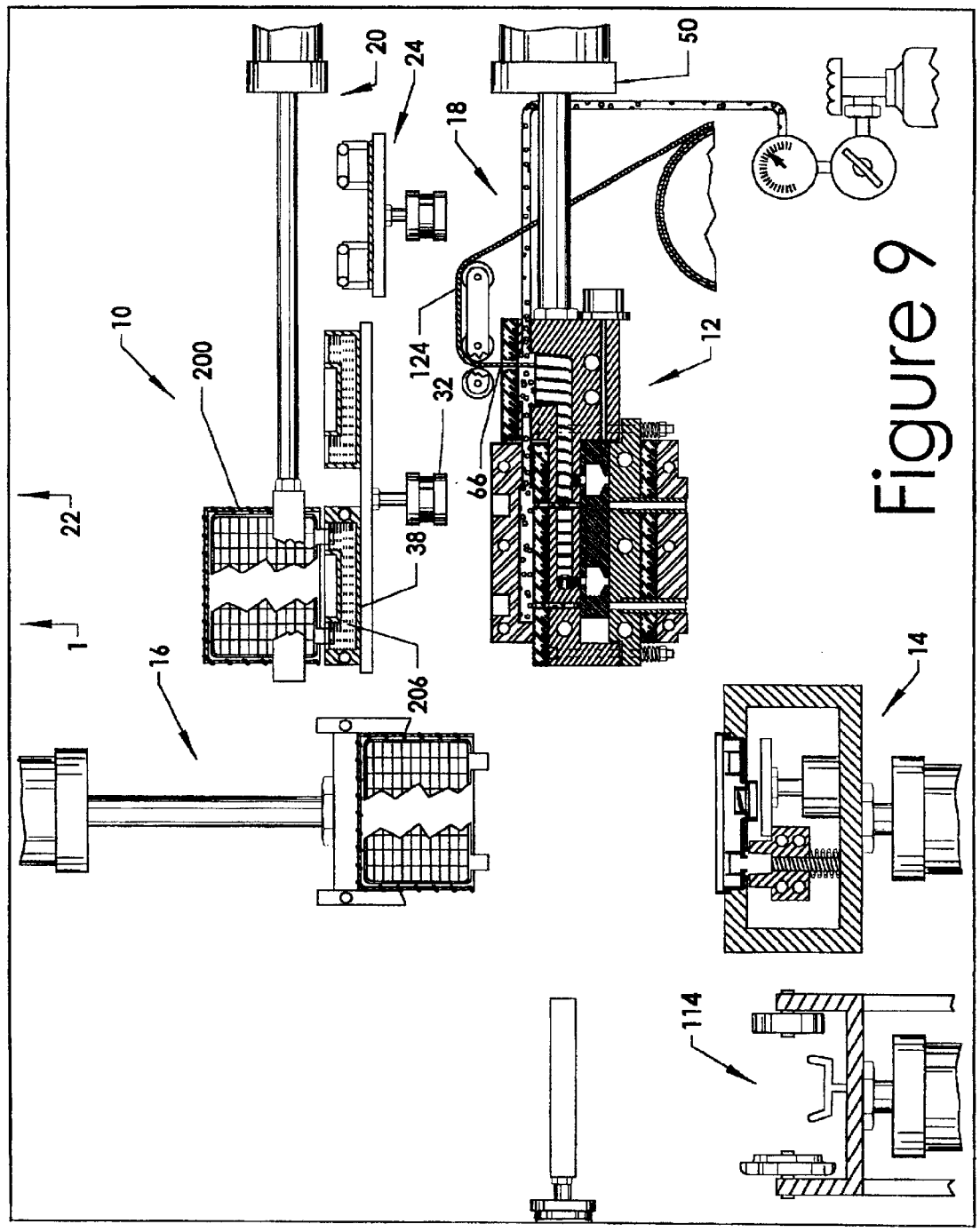
FIG. 9 is a cross sectional view of a battery assembling method showing plate lugs of a first battery container being tinned; a lead dispenser heater unit withdrawn such that thereof is replenished with lead in accordance with the present invention.
Figure 11:
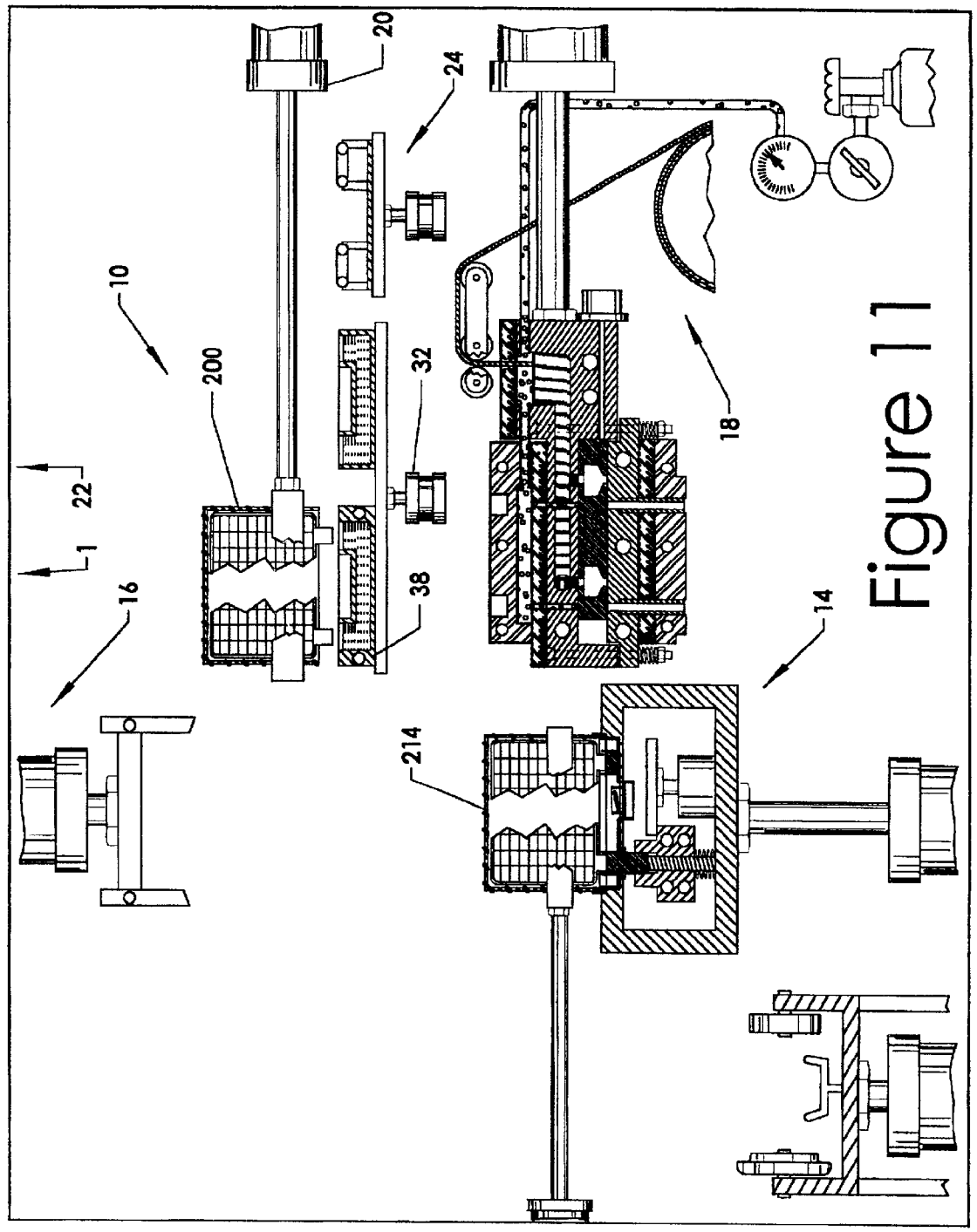
FIG. 11 is a cross sectional view of a battery assembling method showing plate lugs of a first battery container removed from a tinning station; a cover positioner withdrawing from under a second battery container in accordance with the present invention.
Figure 12:
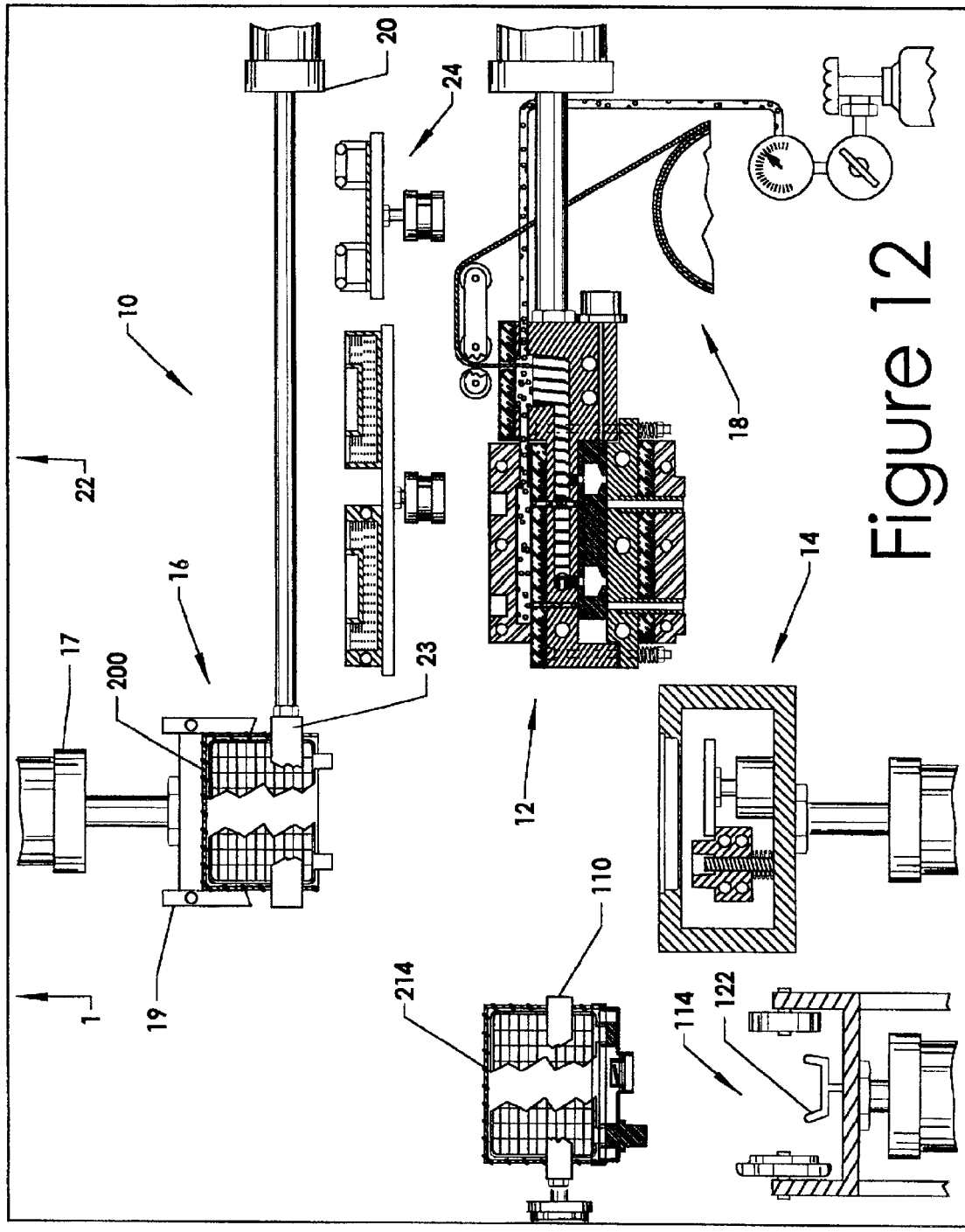
FIG. 12 is a cross sectional view of a battery assembling method showing a first battery container grasped by a container positioner; a second assembled battery grasped by a conveyer gripper and aligned with a conveyor in accordance with the present invention.

The battery assembling method preferably operates in the following manner. With reference to FIG. 1, if the lug preparation area 10 is required, the horizontal container positioner 20 indexes the battery container 200 over the lug heating station 24 and the lugs 209 of the battery plates 202 are heated before fluxing by the at least one heating element 30. With reference to FIG. 5, the horizontal container positioner 20 then indexes the battery container 200 over the fluxing pan 36. With reference to FIG. 6, the lug actuator 32 raises the fluxing pan 36 to coat the lugs 209 with flux 204. With reference to FIGS. 7 and 8, the lug actuator 32 lowers the fluxing pan 36 so that the horizontal container positioner 20 may index the battery container 200 over the tinning pan 38. With reference to FIG. 9, the lug actuator 32 raises the tinning pan 38 to tin the lugs 209 with solder 206. With reference to FIGS. 11 and 12, the lug actuator 32 lowers the tinning pan 38 and the horizontal container positioner 20 indexes the battery container 200 over the lead dispenser/heater unit 12.

Figure 3:
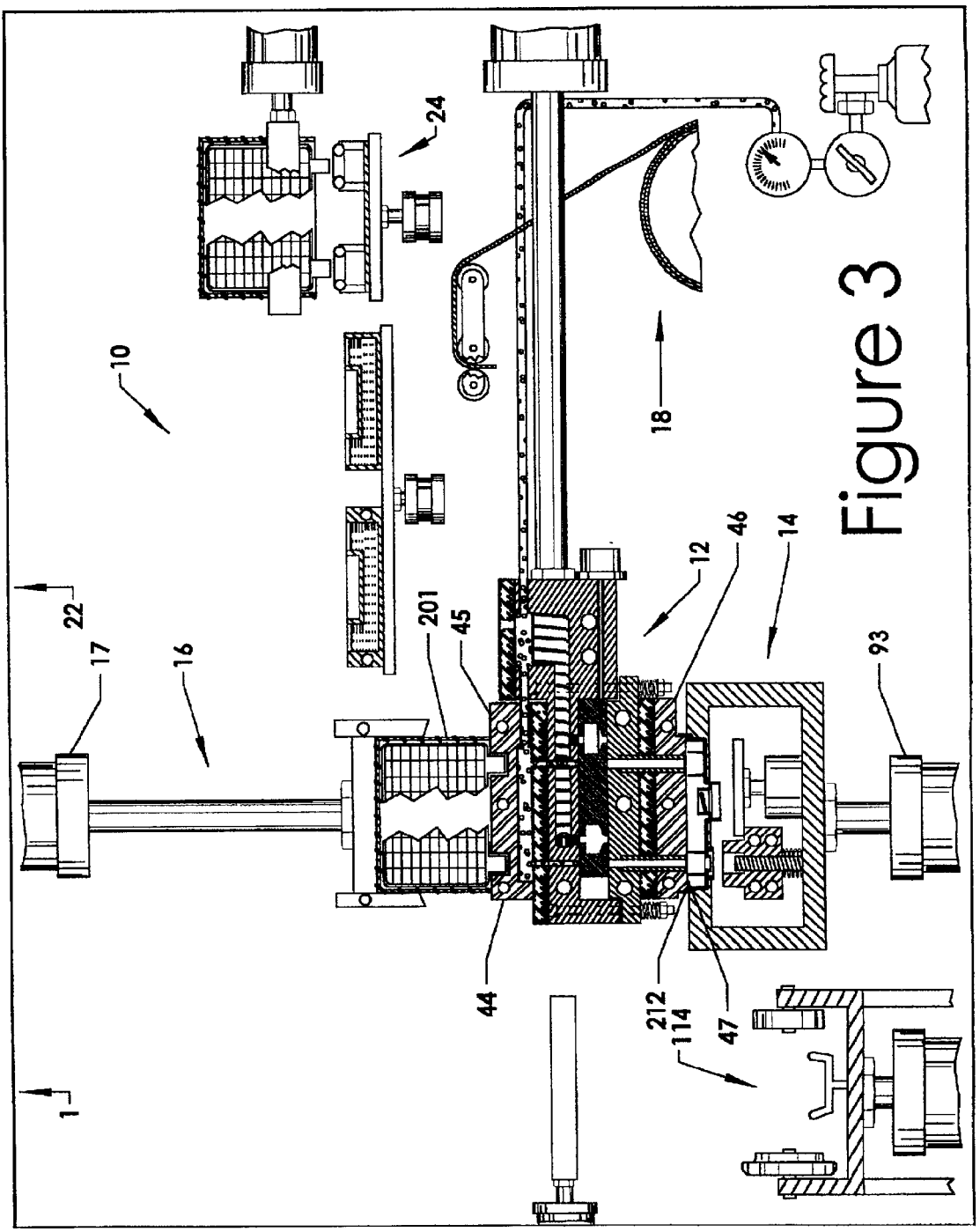
FIG. 3 is a cross sectional view of a battery assembling method where cover and container positioners have brought a second battery cover and container in contact with a lead dispenser/heater unit in accordance with the present invention.
Figure 4:
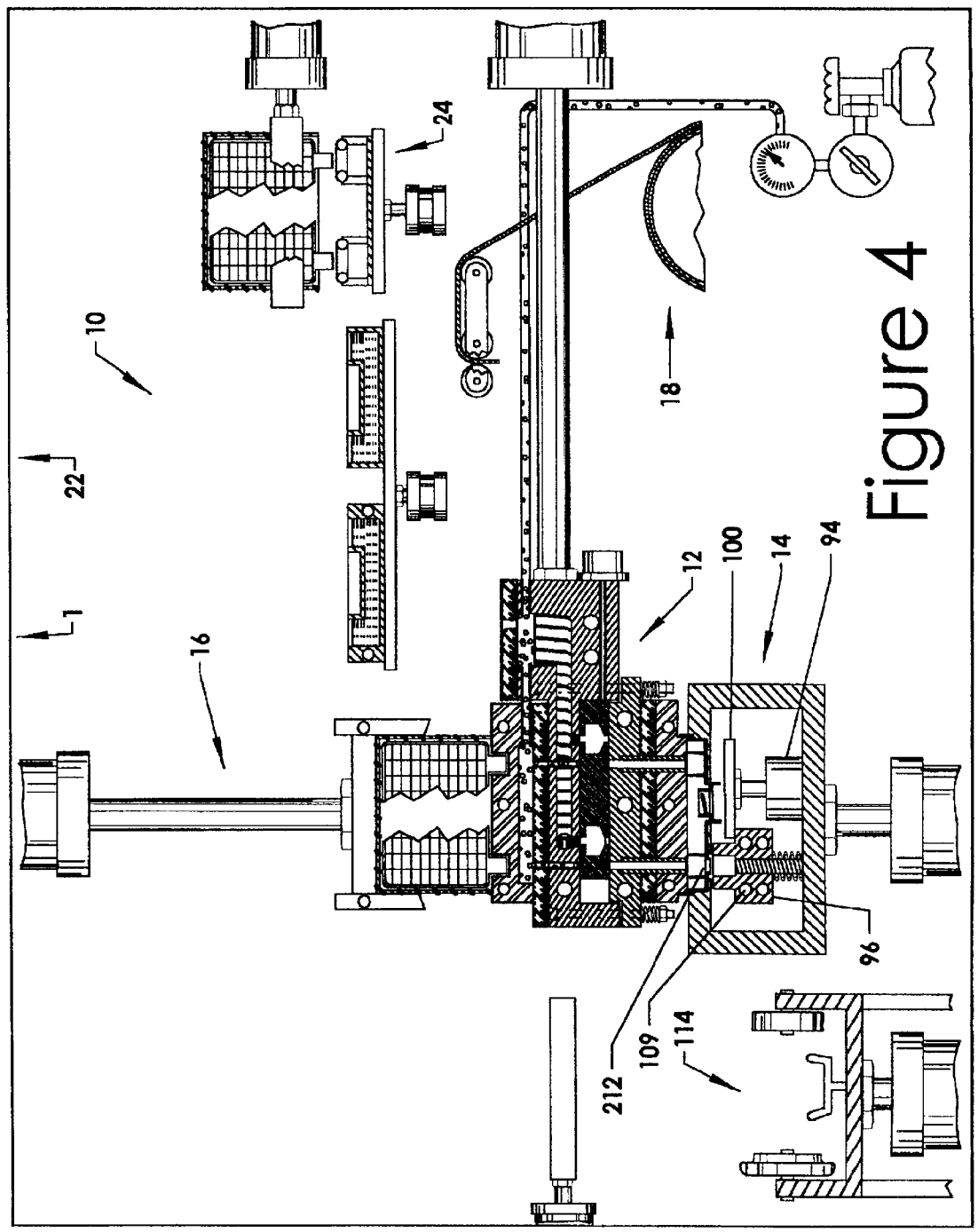
FIG. 4 is a cross sectional view of a battery assembling method where terminal molds have been brought in contact with a second battery cover in accordance with the present invention.

The container gripping fingers 19 grasp the battery container 200 and then the gripping fingers 23 release thereof. With reference to FIG. 3, the container actuator 17 lowers the battery container 200 such that an edge of an open end thereof contacts a heating surface 45 of the container heating platen 44. The cover actuator 93 raises the battery cover 212 such that an edge of an open end contacts the heating surface 47 of the cover heating platen 46. With reference to FIG. 4, the mold actuator 94 raises the retainer plate 100 such that the at least two terminal molds 96 rise to contact terminal openings in the battery cover 212. Each terminal mold 96 is heated with the heater 109. With reference to FIG. 5, the lead dispensing shuttle plate 48 is slid into a dispense position by the shuttle actuator 76. The molten lead 210 descends through the lead exit openings 57, the openings in the shuttle retaining plate 56, and the lead bushings 80. The molten lead drops into plate strap mold wells in the battery cover 212 and the terminal molds 96 form plate straps and terminals.

After the molten lead has filled the plate strap mold wells and terminal molds 96, the shuttle actuator 76 pulls the dispensing shuttle plate 48 back to the fill position. With reference to FIG. 9, the dispenser actuator 50 pulls the lead dispenser/heater unit 12 back such that the strip opening 66 aligns with a lead strip 124 of the lead feeder 18. The lead 210 that was dispensed for previous battery is replaced with new lead from the lead feeder 18. With reference to FIG. 8, the battery container 201 is raised and the battery cover 212 lowered and the lead dispenser/heater unit 12 pulled toward the lead feeder 18.

Figure 10:
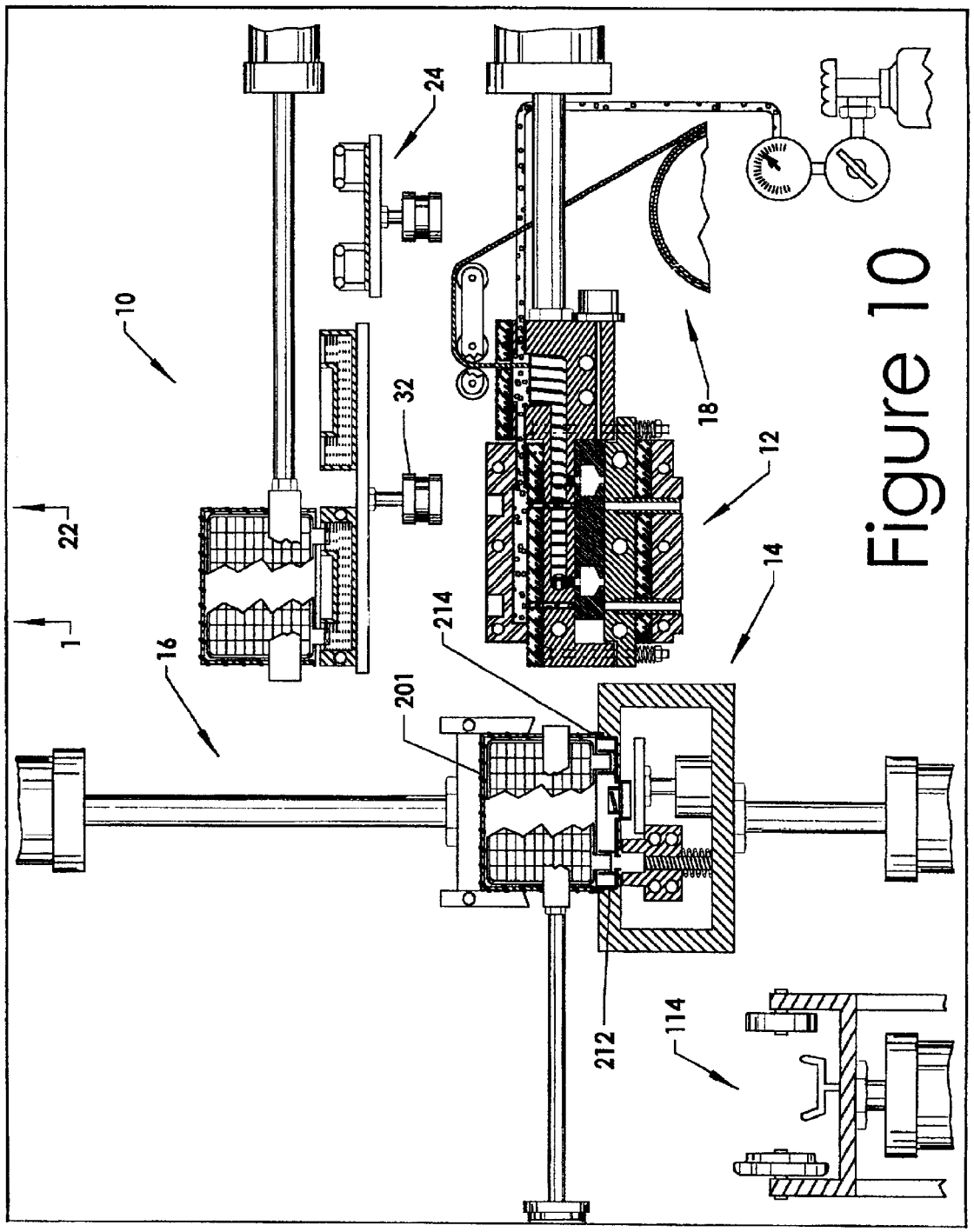
FIG. 10 is a cross sectional view of a battery assembling method showing a second battery cover being heat sealed to a second battery container in accordance with the present invention.

With reference to FIG. 10, after the lead dispenser/heater unit 12 is cleared away, the battery container 201 is lowered and the battery cover 212 raised such that the edge of the open end of the battery container 201 is attached to the edge of the open end of the battery cover 212. The container and cover edge heating platens heat the open ends of the battery container and cover such that the battery cover 212 may be sealed to the battery container 201. The at least two plate straps and terminals are substantially simultaneously cast as the battery cover is sealed to the battery container.

Figure 13:
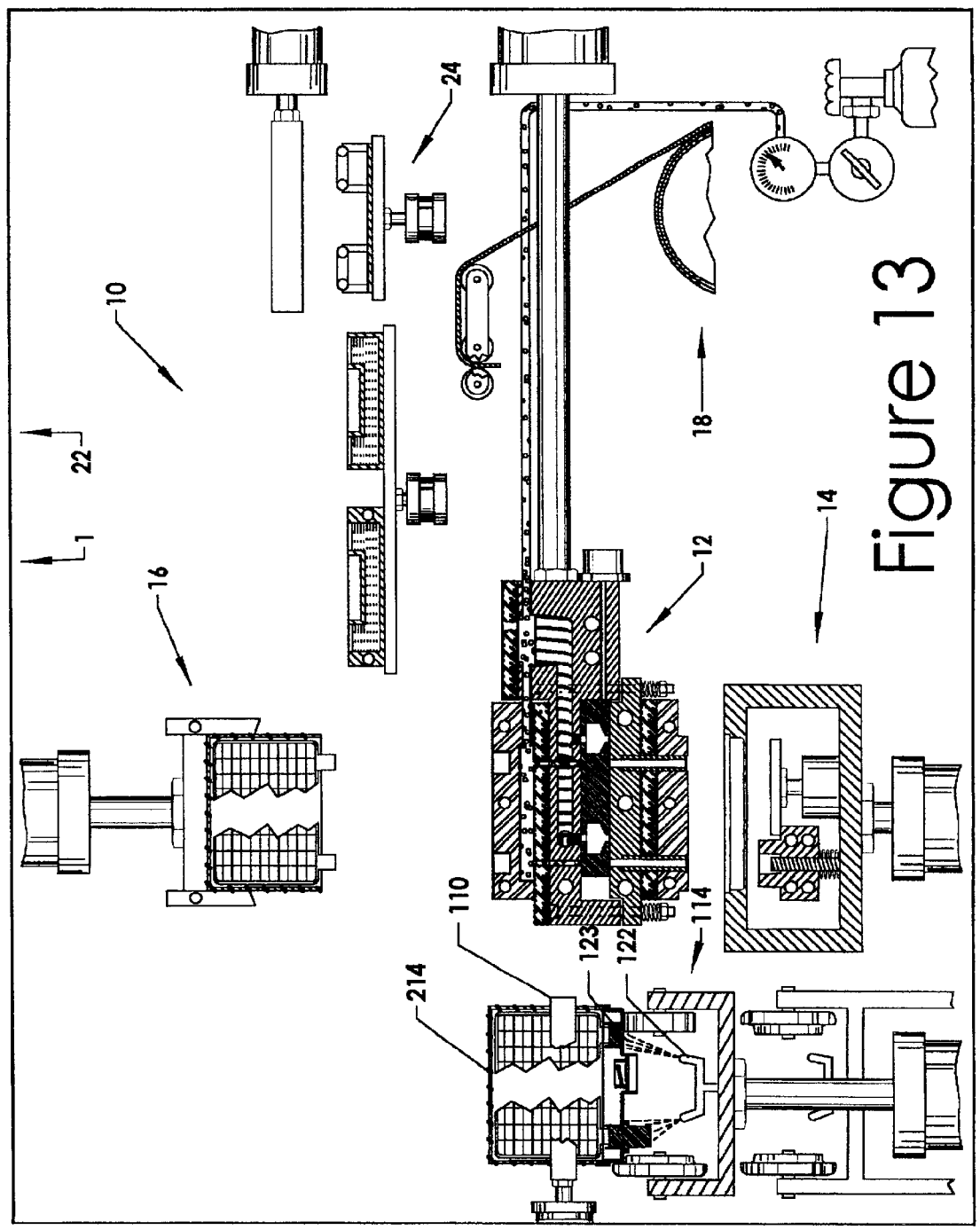
FIG. 13 is a cross sectional view of a battery assembling method showing a movable conveyor section raised to meet a second assembled battery; a lead dispenser/heater unit positioned to receive a new second battery container in accordance with the present invention.
Figure 14:
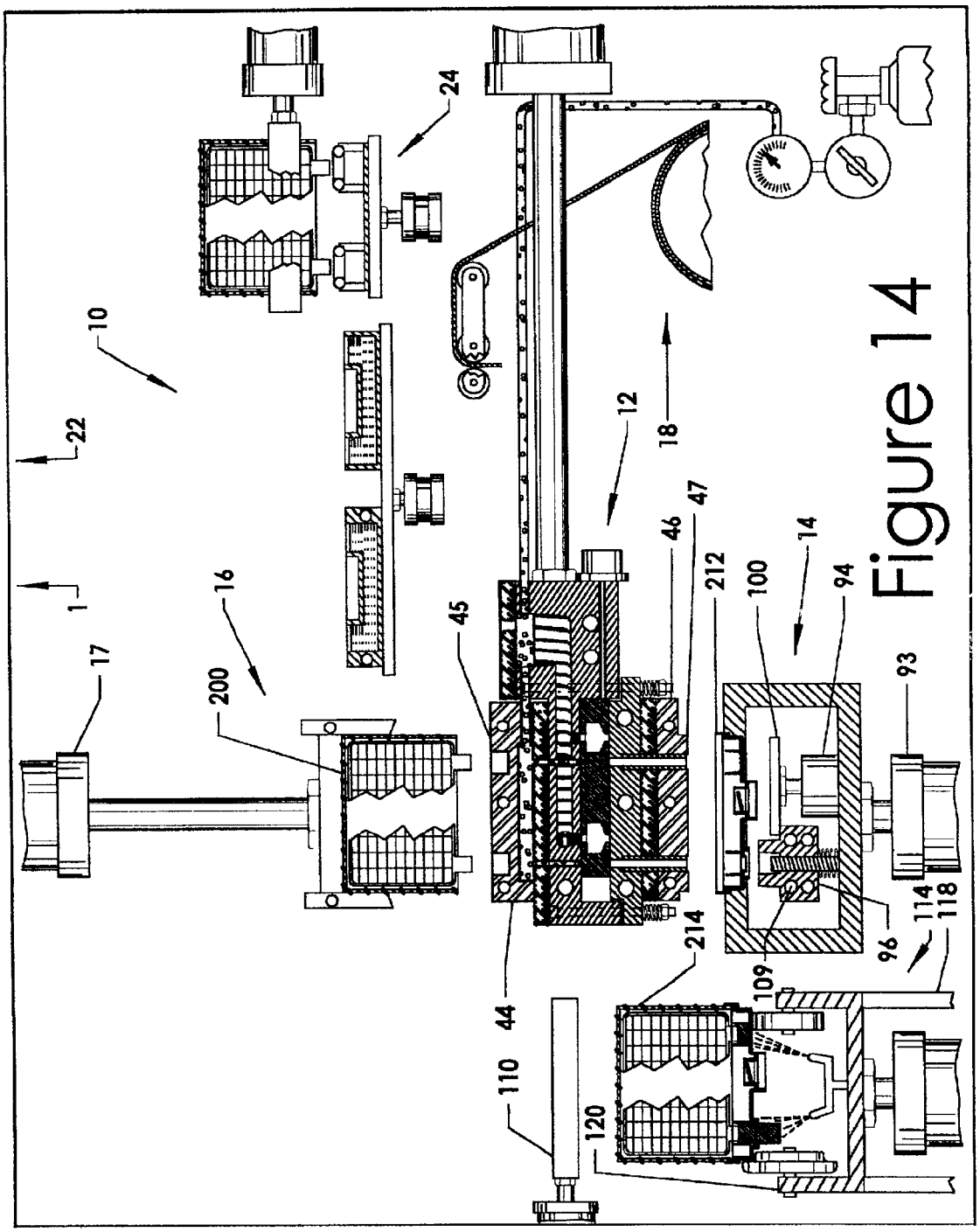
FIG. 14 is a cross sectional view of a battery assembling method showing a new first battery indexed over a heating station; a new second battery container loaded into a container positioner in accordance with the present invention.

The mold heater 109 is turned-off and coolant is run through the at least one coolant path 108. With reference to FIG. 13, once the lead in plate straps and terminals solidify, the assembled battery 214 is grasped by the conveyer gripper 110 and aligned with the conveyor 114 by a conveyer actuator 112. The moveable conveyor section 120 is raised by the vertical conveyer actuator 116 to meet the assembled battery 214. The assembled battery 214 is sprayed with coolant 123 from a coolant spray device 122. With reference to FIG. 14, the conveyer gripper 110 is released and the moveable conveyor section 120 lowers the assembled battery 214 even with the stationary conveyor base 118. The conveyer 114 transports the assembled battery 214 to an external location; where the assembled battery 214 is ready to be filled with electrolyte.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of assembling batteries comprising the steps of:
   (a) supplying a battery container having a plurality of battery plates and a battery cover having at least two terminal apertures and at least two plate strap mold wells;
   (b) heating an open edge of the battery container and an open edge of the battery cover;
   (c) providing at least two terminal molds adjacent the at least two terminal apertures in the battery cover;
   (d) filling said at least two terminal molds and said at least two plate strap mold wells of the battery cover with molten lead from a lead dispenser/heater unit;
   (e) withdrawing said lead dispenser/heater unit and sealing the battery cover to the battery container and substantially simultaneously fusing plate lugs of the battery plates with the molten straps; and
   (f) heating the plate lugs of the battery plates with a heating station before insertion into molten plate straps.

2. The method of assembling batteries of claim 1, further comprising the step of:
   (g) covering exposed areas of molten lead within said lead dispenser/heater unit with an inert gas.

3. The method of assembling batteries of claim 1, further comprising the step of:
   (g) replenishing a reservoir of molten lead in said lead dispenser/heater unit with a portion of a strip of lead.

4. A method of assembling batteries comprising the steps of:
   (a) supplying a battery container having a plurality of battery plates and a battery cover having at least two terminal apertures and at least two plate strap mold wells;
   (b) heating an open edge of the battery container and an open edge of the battery cover;
   (c) providing at least two terminal molds adjacent the at least two terminal apertures in the battery cover;
   (d) filling said at least two terminal molds and said at least two plate strap mold wells of the battery cover with molten lead from a lead dispenser/heater unit;
   (e) withdrawing said lead dispenser/heater unit and sealing the battery cover to the battery container and substantially simultaneously fusing plate lugs of the battery plates with the molten straps; and
   (f) said lead dispenser/heater unit including a container heating platen, a cover heating platen, heater body and a lead dispensing shuttle plate, said container heating platen being mounted to a top of said heater body, said cover heating platen being attached to a bottom of said heater body, said lead dispensing shuttle plate being slidably retained within said heater body, said lead dispensing shuttle plate dispensing molten lead in a dispensing position and receiving molten lead in a fill position.

5. The method of assembling batteries of claim 4, further comprising:
   a container insulator being disposed between said heater body and said container heating platen, a cover insulator being disposed between said heater body and said cover heating platen, a plurality of heater elements being disposed in said heater body, container heating platen, and cover heating platen.

6. A method of assembling batteries comprising the steps of:
   (a) supplying a battery container having a plurality of battery plates and a battery cover having at least two terminal apertures and at least two plate strap mold wells;
   (b) heating an open edge of the battery container and an open edge of the battery cover;
   (c) providing at least two terminal molds adjacent the at least two terminal apertures in the battery cover;
   (d) filling said at least two terminal molds and said at least two plate strap mold wells of the battery cover with molten lead from a lead dispenser/heater unit;
   (e) withdrawing said lead dispenser/heater unit and sealing the battery cover to the battery container and substantially simultaneously fusing plate lugs of the battery plates with the molten plate straps; and
   (f) each said terminal mold having a terminal cavity formed in a top thereof, at least one liquid coolant path and at least one mold heater being formed in a body of each said terminal mold.

7. A method of assembling batteries comprising the steps of:
   (a) supplying a battery container having a plurality of battery plates and a battery cover having at least two terminal apertures and at least two plate strap mold wells;
   (b) heating an open edge of the battery container and an open edge of the battery cover;
   (c) providing at least two terminal molds adjacent the at least two terminal apertures in the battery cover;
   (d) protecting molten lead inside a lead dispenser/heater unit from air by flooding all exposed areas of the molten heat with inert gas;
   (e) filling said at least two terminal molds and said at least two plate strap mold wells of the battery cover with molten lead from a lead dispenser/heater unit;
   (f) withdrawing said lead dispenser/heater unit and sealing the battery cover to the battery container and substantially simultaneously fusing plate lugs of the battery plates with the molten plate straps and at least two terminals; and
   (g) heating the plate lugs of the battery plates with a heating station before insertion into molten plate straps.

8. The method of assembling batteries of claim 7, further comprising the step of:
   (h) replenishing a reservoir of molten lead in said lead dispenser/heater unit with a portion of a strip of lead.

9. A method of assembling batteries comprising the steps of:
   (a) supplying a battery container having a plurality of battery plates and a battery cover having at least two terminal apertures and at least two plate strap mold wells;

(b) heating an open edge of the battery container and an open edge of the battery cover;

(c) providing at least two terminal molds adjacent the at least two terminal apertures in the battery cover;

(d) protecting molten lead inside a lead dispenser/heater unit from air by flooding all exposed areas of the molten lead with inert gas;

(e) filling said at least two terminal molds and said at least two plate strap mold wells of the battery cover with molten lead from a lead dispenser/heater unit;

(f) withdrawing said lead dispenser/heater unit and sealing the battery cover to the battery container and substantially simultaneously fusing plate lugs of the battery plates with the molten plate straps and at least two terminals; and (g) said lead dispenser/heater unit including a container heating platen, a cover heating platen, a heater body and a lead dispensing shuttle plate, said container heating platen being mounted to a top of said heater body, said cover heating platen being attached to a bottom of said heater body, said lead dispensing shuttle plate being slidably retained within said heater body, said lead dispensing shuttle plate dispensing molten lead in a dispensing position and receiving molten lead in a fill position.

10. The method of assembling batteries of claim 9, further comprising:

a container insulator being disposed between said heater body and said container heating platen, a cover insulator being disposed between said heater body and said cover heating platen, a plurality of heater elements being disposed in said heater body, container heating platen, and cover heating platen.

11. A method of assembling batteries comprising the steps of:

(a) supplying a battery container having a plurality of battery plates and a battery cover having at least two terminal apertures and at least two plate strap mold wells;

(b) heating an open edge of the battery container and an open edge of the battery cover;

(c) providing at least two terminal molds adjacent the at least two terminal apertures in the battery cover;

(d) protecting molten lead inside a lead dispenser/heater unit from air by flooding all exposed areas of the molten lead with inert gas;

(e) filling said at least two terminal molds and said at least two plate strap mold wells of the battery cover with molten lead from a lead dispenser/heater unit;

(f) withdrawing said lead dispenser/heater unit and sealing the battery cover to the battery container and substantially simultaneously fusing plate lugs of the battery plates with the molten plate straps and at least two terminals; and (g) each said terminal mold having a terminal cavity formed in a top thereof, at least one liquid coolant path and at least one mold heater being formed in a body of each said terminal mold.

* * * * *